(12) United States Patent
Hofmann et al.

(10) Patent No.: US 10,029,938 B2
(45) Date of Patent: Jul. 24, 2018

(54) METHOD FOR PRODUCING SYNTHETIC QUARTZ GLASS OF $SiO_2$ GRANULATE AND $SiO_2$ GRANULATE SUITED THEREFOR

(71) Applicant: Heraeus Quarzglas GmbH & Co. KG, Hanau (DE)

(72) Inventors: Achim Hofmann, Frankfurt (DE); Thomas Kayser, Leipzig (DE); Matthias Otter, Münster (DE); Bodo Kühn, Gelnhausen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 515 days.

(21) Appl. No.: 14/864,103

(22) Filed: Sep. 24, 2015

(65) Prior Publication Data

US 2016/0090319 A1 Mar. 31, 2016

(30) Foreign Application Priority Data

Sep. 29, 2014 (EP) .................................. 14186768

(51) Int. Cl.
*C03B 19/06* (2006.01)
*C03C 3/06* (2006.01)
(Continued)

(52) U.S. Cl.
CPC .......... *C03B 19/066* (2013.01); *C03B 19/108* (2013.01); *C03B 19/1095* (2013.01);
(Continued)

(58) Field of Classification Search
CPC . C03B 19/066; C03B 19/108; C03B 19/1095; C03B 19/06; C03C 11/00;
(Continued)

(56) References Cited

U.S. PATENT DOCUMENTS 4,042,361 A 8/1977 Bihuniak et al.
6,360,563 B1 3/2002 Gerhardt et al.
(Continued)

FOREIGN PATENT DOCUMENTS

CN 1413175 A 4/2003
CN 103153887 A 6/2013
(Continued)

OTHER PUBLICATIONS

Search Report and Opinion dated Mar. 30, 2015 in EP Application No. 14186768.9.

*Primary Examiner* — Patricia L. Hailey
*Assistant Examiner* — Smita S Patel
(74) *Attorney, Agent, or Firm* — Panitch Schwarze Belisario & Nadel LLP (57) ABSTRACT

A method for producing synthetic quartz glass by fusion of $SiO_2$ granulate involves synthesizing amorphous $SiO_2$ primary particles, granulating the amorphous $SiO_2$ primary particles to form an open-pore $SiO_2$ granulate, sintering the open-pore $SiO_2$ granulate by heating in a sintering atmosphere at a sintering temperature and for a sintering period to form a densified $SiO_2$ granulate, and melting the densified $SiO_2$ granulate at a melting temperature to form the synthetic quartz glass. To provide an inexpensive production of low-bubble transparent components of quartz glass despite the use of still open-pore $SiO_2$ granulate, the sintering atmosphere, sintering temperature and sintering duration are adjusted such that the densified $SiO_2$ granulate still comprises open pores but manifests a material-specific infrared transmission $T_{1700}$ at a wavelength of 1700 nm. This transmission is in the range of 50-95% of the infrared transmission $T_{1700}$ of quartz glass granules of the same material.

15 Claims, 3 Drawing Sheets

(51) Int. Cl.
*C03C 11/00* (2006.01)
*C03C 12/00* (2006.01)
*C03B 19/10* (2006.01)

(52) U.S. Cl.
CPC ............... *C03C 3/06* (2013.01); *C03C 11/00* (2013.01); *C03C 12/00* (2013.01); *C03B 2201/02* (2013.01); *C03C 2201/02* (2013.01)

(58) Field of Classification Search
CPC ....... C03C 12/00; C03C 2201/02; C03C 3/06; C03C 3/04; C03C 3/00
See application file for complete search history.

(56) References Cited

U.S. PATENT DOCUMENTS

| | | | |
|---|---|---|---|
| 6,380,110 B1 | 4/2002 | Werdecker et al. | |
| 6,849,242 B1 | 2/2005 | Koeppler et al. | |
| 2003/0041623 A1* | 3/2003 | Werdecker | C03B 19/09 65/17.6 |
| 2007/0145332 A1 | 6/2007 | Koeppler et al. | |
| 2010/0179269 A1 | 7/2010 | Schachtely et al. | |
| 2013/0219963 A1 | 8/2013 | Lehmann et al. | |
| 2015/0059407 A1 | 3/2015 | Lehmann et al. | |

FOREIGN PATENT DOCUMENTS

| | | |
|---|---|---|
| DE | 19962451 C1 | 8/2001 |
| DE | 102004038602 B3 | 12/2005 |
| DE | 102012006914 A1 | 10/2013 |
| EP | 0335875 B1 | 8/1993 |
| EP | 0574642 A1 | 12/1993 |
| EP | 1076043 A2 | 2/2001 |
| EP | 1088789 A2 | 4/2001 |
| JP | H07277725 A | 10/1995 |
| JP | H10287416 A | 10/1998 |
| JP | 2001089125 A | 4/2001 |
| JP | 2007520408 A | 7/2007 |
| JP | 2011-207719 A | 10/2011 |
| WO | 8803914 A1 | 6/1988 |
| WO | 2007085511 A1 | 8/2007 |

* cited by examiner

| Material | Last hot process | Diameter D$_{50}$ value [μm] | BET [m²/g] | Bulk density [kg/l] | Type of porosity | $\frac{\tau_{1700}}{\tau_{1700\,(\text{ref. sample})}}$ [%] | $\frac{\tau_{500}}{\tau_{1700}}$ | $\tau_{1700}$ (normalized to bulk density) [% g/cm³] | TBCS value (mm²) |
|---|---|---|---|---|---|---|---|---|---|
| Soot | Without pretreatment | 0.1 | 30.0 | 0.1 | open | 8.5% | 0.08 | 1.1 | not applic. |
| Freeze granulate | Slip frozen, dried 200°C | 216 | 30.0 | 0.54 | open | 31.0% | 0.21 | 4.1 | >>10 |
| Spray granulate | Slip cold, spray tower 400°C | 214 | 30.0 | 0.80 | open | 44.7% | 0.14 | 5.7 | >>10 |
| A Pre-sintering slight 1 | Dynamic, 1200°C, high throughput | 191 | 28.0 | 0.90 | open | 57.4% | 0.15 | 7.3 | 1.5 |
| B Pre-sintering slight 2 | Dynamic, 1200°C, mean throughput | 187 | 25.0 | 0.97 | open | 69.0% | 0.18 | 8.8 | 0.33 |
| C Pre-sintering medium 1 | Dynamic, 1200°C, mean throughput | 189 | 22.0 | 0.96 | open | 75.5% | 0.18 | 9.6 | 0.3 |
| D Pre-sintering medium 2 | Dynamic, 1200°C, low throughput | 155 | 9.0 | 1.04 | open | 85.0% | 0.20 | 10.8 | 0.2 |
| E Pre-sintering strong 1 | Dynamic, 1250°C, low throughput | 230 | 3.1 | 1.15 | partly open | 93.7% | 0.24 | 11.9 | 0.1 |
| F Pre-sintering strong 2 | Static 1250°C | 265 | 0.0 | 1.29 | partly open | 93.8% | 0.80 | 11.9 | 0.25 |
| G Pre-sintering very strong | Static, 1330°C | 183 | 0.1 | 1.27 | closed | 103.0% | 0.97 | 13.1 | 2 |
| Reference fully vitrified | Static under vacuum | 166 | 0.0 | 1.2 | closed | 100.0% | 0.98 | 12.7 | 0.1 |

METHOD FOR PRODUCING SYNTHETIC QUARTZ GLASS OF SiO₂ GRANULATE AND SiO₂ GRANULATE SUITED THEREFOR

BACKGROUND OF THE INVENTION

Amorphous particles of synthetic $SiO_2$ are, e.g., obtained by flame hydrolysis or oxidation of silicon compounds, by polycondensation of organic silicon compounds according to the so-called sol-gel method, or by hydrolysis and precipitation of inorganic silicon compounds in a liquid. In the industrial production of synthetic quartz glass, such $SiO_2$ primary particles are also obtained as so-called soot or filter dust.

$SiO_2$ primary particles are finely divided. In the sol-gel method, one typically obtains mean particle sizes in the range of 0.5 µm and 5 µm, and of less than 0.2 µm in flame hydrolysis. They are inter alia used as starting material for the production of quartz glass. On account of their small particle size and the accompanying large specific surface area, the $SiO_2$ primary particles are, however, not free-flowing, extremely sinter-active, and can be easily blown away, which impedes immediate fusion into quartz glass. Therefore, they are normally granulated and pre-densified in advance. Examples of suitable build-up or press granulation methods are roll granulation in a pan granulator, spray granulation, centrifugal atomization, fluidized-bed granulation, granulation methods using a granulating mill, compaction, roller presses, briquetting, flake production, or extrusion.

During granulation, discrete, rather large agglomerates are formed due to agglomeration of the $SiO_2$ primary particles; these are herein called "$SiO_2$ granulate particles" or briefly "granulate particles." They have a multitude of open pores, forming a large pore space. In their entirety, the granulate particles form a "porous $SiO_2$ granulate," i.e., "open-pore $SiO_2$ granulate."

Such porous $SiO_2$ granulate is free-flowing and, by comparison with finely divided $SiO_2$ dust, shows an increased bulk weight that can be further increased by thermal or mechanical treatment.

Porous $SiO_2$ granulate is used directly as a filler or for producing opaque quartz glass. A method for producing synthetic opaque quartz glass by melting $SiO_2$ granulate is known from DE 199 62 451 A1. The starting material is formed from amorphous, nanoscale, pyrogenic $SiO_2$ particles which are produced by flame hydrolysis of $SiCl_4$. An aqueous dispersion is produced therefrom and moisture is removed from the dispersion under continuous stirring in a mixer until the dispersion decomposes, forming a crumbly mass. The granulate particles produced thereby are roundish and have diameters in the range between 160 µm and 1000 µm and a specific (BET) surface area of 50 m²/g. The open-pore granulate is thermally pre-densified in a continuous furnace with a throughput of 10 kg/h at a temperature of about 1200° C. in a chlorine-containing atmosphere. Due to this thermal pretreatment, a temperature gradient is evolving over the volume of the individual granulate particles, resulting in low density in the central region and in high density in an outer region. Moreover, the granulate is cleaned during this treatment and freed of hydroxyl groups. The mean particle size of the pre-densified $SiO_2$ granulate is 420 µm and has a specific (BET) surface area of 34 m²/g and a tamped density of 1.1 g/cm³. The total content of the impurities of Li, Na, K, Mg, Ca, Fe, Cu, Cr, Mn, Ti, and Zr is less than 200 wt. ppb.

The synthetic $SiO_2$ granulate which continues to be open-pored is used for producing a tubular component of opaque quartz glass. A layer-shaped bulk material of the granulate is fused zone by zone on the inner wall of a tubular metal mold which is rotating about its longitudinal axis by an electric arc, starting from the inner bore. This results in the formation of a vitrification front progressing to the outside toward the metal mold, the front forming the boundary between the still open-pore layer region and an already partly molten region. It is true that most of the pore space of the granulate is closed in this process by sintering and collapsing, but the entrapped gases lead to the formation of a multitude of bubbles in the quartz glass on which incident light is scattered; this leads to opacity both in the visible spectral range and particularly also in the infrared spectral range.

However, in comparison with the production of opaque quartz glass, the fusion of the open-pore $SiO_2$ granulate into transparent synthetic quartz glass poses problems. On the one hand, this is due to the fact that gas-filled pores are enclosed during fusion of the porous $SiO_2$ granulate and may lead to bubbles which cannot be removed from the highly viscous quartz glass mass or can only be removed at a very slow pace. On the other hand, the open-pore $SiO_2$ granulate has a strong heat-insulating effect, making it difficult to heat the bulk granulate to a uniformly high temperature. The excellent heat-insulating effect is, e.g., demonstrated in that the pressed pyrogenic $SiO_2$ particles are used for thermal insulation in high-performance insulation panels, such as vacuum insulation panels.

Therefore, an adequate heat energy for melting a bulk material of porous $SiO_2$ granulate or for melting a molded body of the granulate can be supplied from the outside only at a very slow pace and under great energy expenditure. This problem increases with the volume of the bulk material or the molded body, respectively, and may lead to an irregular temperature distribution during fusion and thus to inhomogeneous properties of the vitrified component.

Accordingly, for sophisticated applications which require the absence of bubbles and uniform material properties of the end product, a previous thermal densification is considered to be necessary, ideally until complete vitrification of the porous granulate occurs. The dense glass particles obtained by complete vitrification of the porous $SiO_2$ granulate particles are also called "quartz glass particles" here and in the following, the quartz glass particles in their entirety forming synthetic "quartz glass granules." Many different techniques are known for the production of dense quartz glass granules from porous $SiO_2$ granulate.

It is, e.g., suggested in EP 1 076 043 A2 that porous $SiO_2$ granulate should be poured into a combustion gas flame to finely distribute it therein and to vitrify the same at temperatures of 2000-2500° C. The granulate is preferably obtained by spray granulation or wet granulation of filter dust and has grain sizes in the range of 5-300 µm. Prior to vitrification it can be heated and pre-densified by treatment with microwave radiation.

The degree of sintering of a given granulate particle depends on its particle size and on the heat input which, in turn, is defined by the residence time in the combustion gas flame and by the flame temperature. As a rule, however, the granulate has a certain particle size distribution, and the combustion gas flame has regions of different flow velocities and flame temperatures. This leads to irregular sintering degrees that can hardly be reproduced. Moreover, there is the risk that the quartz glass particles are contaminated by the combustion gases. Specifically, loading with hydroxyl groups using a hydrogen-containing combustion gas flame should here be mentioned; such loading leads to a frequently undesired reduction of the viscosity of the quartz glass.

EP 1 088 789 A2 suggests that for the vitrification of porous $SiO_2$ granulate, the granulate should first be purified by heating in an HCl-containing atmosphere in a rotary furnace, subsequently calcined in a fluidized bed, and then vitrified in a vertical fluidized bed apparatus or in a crucible in vacuum, helium or hydrogen into synthetic quartz glass granules.

In a similar method according to JP 10278416 A, synthetically produced particulate $SiO_2$ gel is continuously densified in a rotary furnace. The rotary tube is divided into several temperature zones covering the temperature range of 50° C. to 1,100° C. The particulate $SiO_2$ gel with particle sizes between 100 μm and 500 μm is first freed of organic constituents in the rotary tube, which is rotating at 8 rpm, by supply of an oxygen-containing gas. In a sintering zone in which the furnace atmosphere contains oxygen and optionally argon, nitrogen or helium, it is sintered into open-pore $SiO_2$ granulate. The sintered $SiO_2$ granulate still contains a high concentration of silanol groups. To eliminate these groups and to achieve complete densification, the sintered but still open-pore granulate is calcined in the end at an elevated temperature of 1300° C. in a quartz glass crucible with an inner diameter of 550 nm in batches of 130 kg and vitrified.

DE 10 2012 006 914 A1 discloses a method for producing synthetic quartz glass granules by vitrifying a free-flowing $SiO_2$ granulate. This method comprises the steps of: granulating pyrogenically produced silicic acid to form an $SiO_2$ granulate of porous granulate particles, drying the $SiO_2$ granulate, cleaning the $SiO_2$ granulate by heating in a halogen-containing atmosphere, and vitrifying the cleaned $SiO_2$ granulate in a treatment gas which contains at least 30% by volume of helium and/or hydrogen to form vitrified quartz glass granules. Cleaning and vitrification of the $SiO_2$ granulate are each carried out in a rotary furnace which comprises a rotary tube made of a ceramic material.

WO 88/03914 A1 also teaches about the reduction of the BET surface area of an amorphous porous $SiO_2$ powder by using a rotary furnace in a helium- and/or hydrogen-containing atmosphere. It is suggested that $SiO_2$ soot dust should be mixed with water, resulting in a moist crumbly mass. This mass is put into a rotary furnace and densified at a temperature of 600° C. into a powder having grain sizes of 0.1 mm to 3 mm. The pre-densified $SiO_2$ powder is subsequently vitrified in a separate furnace.

DE 10 2004 038 602 B3 discloses a method for producing electrically molten synthetic quartz glass for use in lamp and semiconductor manufacture. Thermally densified $SiO_2$ granulate is used as a starting material for the electrically molten quartz glass. The granulate is formed by granulating an aqueous suspension consisting of amorphous, nanoscale and pyrogenic $SiO_2$ particles which are produced by flame hydrolysis of $SiCl_4$. Roundish granulate grains with outer diameters in the range between 160 μm and 1000 μm are obtained. The granulate is dried in a rotary furnace at about 400° C. and densified at a temperature of about 1420° C. up to a BET surface area of about 3 $m^2/g$. For the complete vitrification, the individual grains of the granulate are subsequently heated under different atmospheres, such as helium, hydrogen or vacuum. The heating profile during vitrification of the granulates involves heating up to 1,400° C. at a heating rate of 5° C./min and a holding time of 120 min. After this treatment, the individual granulate grains are vitrified in themselves. The grains are present individually without being fused into a mass. The granulate is further processed in an electric melting process into quartz glass; for instance, it is fused in a crucible into a molded body or is continuously pulled in a crucible pulling method into a strand.

WO 2007/085511 A1 describes a granulation method in which finely divided $SiO_2$ start powder is agglomerated mechanically, also using lubricants or binders, by way of roller compaction into rather coarse particles and is densified by mechanical pressure. The $SiO_2$ start powder is passed between and through oppositely rotating profiled rollers and is thereby densified into $SiO_2$ granulate which is obtained in the form of so-called "crusts." These crusts or fragments thereof are dried at a temperature in the range of 400° C. to 1100° C. in a halogen-containing atmosphere and are densely sintered in the range of 1200° C. to 1700° C. into quartz glass granules.

These quartz glass granules can be directly fused by flame or plasma burners or in electrically heated melting crucibles or melting molds and processed into components of transparent or opaque synthetic quartz glass, such as tubes, rods, plates, holders, bell jars, reactors, casting channels, flanges or crucibles for semiconductor or lamp manufacture and chemical process engineering (this process step is also called "direct fusion" in the following).

Alternatively, in a process variant to be called "indirect fusion," a porous molded body is first produced from the dense quartz glass granules in ceramic-mechanical molding steps and the molded body is sintered into the quartz glass component. Such a method is, e.g., known from U.S. Pat. No. 4,042,361 A. The production of a quartz glass crucible with the help of a slip casting method using synthetic quartz glass granules is described therein. The quartz glass granules are produced from pyrogenically produced $SiO_2$ powder, which is obtained as filter dust in the flame hydrolysis of a silicon compound, in that a gel is produced from the loose $SiO_2$ powder first by mixing into water and stirring, the solid content of said gel varying between 30% by wt. and 45% by wt. depending on the type and speed of the stirring process. The fragments obtained after drying of the gel are sintered at temperatures between 1150° C. and 1500° C. into dense quartz glass granules. These are subsequently finely milled into grain sizes between 1 μm to 10 μm and stirred into an aqueous slip. The slip is cast into a crucible mold, and the layer adhering to the edge of the crucible is dried to form a porous green body. The green body is then vitrified at a temperature between 1800° C. and 1900° C. into the quartz glass crucible.

The pre-vitrification of the open-pore $SiO_2$ granulate into dense quartz glass granules that are as bubble-free as possible constitutes, in principle, an appropriate intermediate step for the fusion of the granulate into low-bubble transparent quartz glass. A separate vitrification process with temperatures above the softening temperature of quartz glass, i.e., above 1150° C., typically about 1400° C., must however be accepted in return.

Irrespective of this, it is not trivial and is often also not possible to produce bubble-free quartz glass granules from porous $SiO_2$ granulate. The best results are achieved during vitrification under vacuum or in helium or hydrogen as a sintering aid for improving the heat transfer or for minimizing bubbles. This, however, increases not only the consumption costs, but also the risk of safety (in the case of hydrogen because the risk of explosion during reaction with oxygen). This vitrification process is long-winded and entails high energy consumption.

However, even the direct or indirect fusion or the sintering of a molded body from completely dense quartz glass granules does not readily eliminate the problem of bubble formation in the resulting quartz glass, for the space between the dense quartz glass particles may contain gases that during the fusion process are entrapped within the viscous quartz glass melt and can hardly escape or be removed by homogenization measures. They cause bubbles and other disorders in the quartz glass.

Therefore, degasification measures are indispensable for avoiding bubbles not only during vitrification of the porous $SiO_2$ granulate into dense quartz glass granules, but also in the direct or indirect fusion process whenever one aims at a bubble-free transparent quartz glass. Suitable measures include the fusion or the sintering of the quartz glass granules under vacuum or in an atmosphere of helium or hydrogen, but with the above-explained efforts in terms of time, energy, and material.

BRIEF SUMMARY OF THE INVENTION

The present invention relates to a method for producing synthetic quartz glass comprising:
(a) synthesizing amorphous $SiO_2$ primary particles;
(b) granulating the amorphous $SiO_2$ primary particles to form an open-pore $SiO_2$ granulate;
(c) sintering the open-pore $SiO_2$ granulate by heating in a sintering atmosphere at a sintering temperature and for a sintering period to form a densified $SiO_2$ granulate; and
(d) melting the densified $SiO_2$ granulate at a melting temperature to form the synthetic quartz glass.

It is the object of the present invention to provide a method which, starting from open-pore $SiO_2$ granulate, provides for inexpensive production of low-bubble transparent components of quartz glass.

This object, starting from a method of the above-mentioned type for producing transparent quartz glass, is achieved according to the invention by a method in which sintering atmosphere, sintering temperature and sintering duration are adjusted during sintering in step (c) such that the densified $SiO_2$ granulate still comprises open pores but manifests a material-specific infrared transmission $T_{1700}$ at a wavelength of 1700 nm, which transmission is in the range of 50-95% of the infrared transmission $T_{1700}$ of quartz glass granules of the same material.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

In the processing of initially porous $SiO_2$ granulate into transparent quartz glass, a distinction can be made between hot treatment steps which are less complicated in terms of time, energy, and material, and those in which complicated measures have to be taken for achieving the desired absence of bubbles, e.g., evacuation measures at a high temperature. The method according to the invention aims at reducing the share of the complicated hot treatment steps in favor of less complicated ones. To achieve this aim, the following measures are taken.

The pre-production of fully vitrified quartz glass granules which is standard for producing high-quality transparent quartz glass is avoided. As a consequence, the efforts entailed by this intermediate step in terms of time, energy, and material are also not required. Instead, a still porous $SiO_2$ granulate which can be produced with less effort is provided for the melting process. Normally, however, porous granulate cannot be processed into transparent quartz glass in a melting process with an economically reasonable melting period and melting temperature. Although the use of porous granulates for fusion into transparent quartz glass is technologically possible in this respect, it is limited. Surprisingly, it has however been found that this limitation can be eliminated if the porous granulate to be used shows a specific transparency in the infrared wavelength range. The infrared (IR) transparency should not be too low or too high. Such a granulate shall also be called "IR transparency-optimized $SiO_2$ granulate" in the following. It may be melted by taking comparatively small efforts in terms of time, energy, and material into a high-quality quartz glass. This aspect of the method according to the invention shall be explained in more detail hereinafter.

To solve the problem regarding the formation of bubbles in the melting process, degassing measures have to be taken, independently of whether vitrified, dense quartz-glass granules or a still open-pore $SiO_2$ granulate is used. Known degassing measures involve applying a negative pressure and in replacing gases prevailing within bulk particles with helium or hydrogen. The use of still open-pore granulate is advantageous in this respect because it can still be exposed to such degassing measures in the melting process, in the sense that gases present in the granulate can be eliminated and the inclusion of gases can be counteracted.

The problems encountered by using the still porous granulate with respect to the thermal insulation and the supply of the heat energy required for fusion are mitigated according to the invention by way of a $SiO_2$ granulate which is optimized with respect to IR transparency. This granulate has a specific transparency for IR radiation in the wavelength range of about 500 nm to about 2400 nm. Within this wavelength range, absorption bands are found that are normally due to hydroxyl groups or water and that need not be considered in this context. The transmission at the wavelength of 1700 nm that is substantially unaffected by absorptions by hydroxyl groups and water is representative of the IR transparency of the granulate.

Due to their transparency for IR radiation, the scattering effect of the granulate particles for this radiation is reduced and the supply of the thermal energy for fusing the $SiO_2$ granulate particles is thereby facilitated. It is thereby possible to significantly reduce the fusion period and/or the fusion temperature in the use of a $SiO_2$ granulate optimized to IR transparency, as compared with a non-optimized granulate.

A suitable measuring method for determining the IR transmission shall be explained hereinafter. The IR transmission of the granulate particles in bulk form or of a molded body made from the granulate particles depends on the degree of the thermal densification of the $SiO_2$ granulate.

Figure 2:
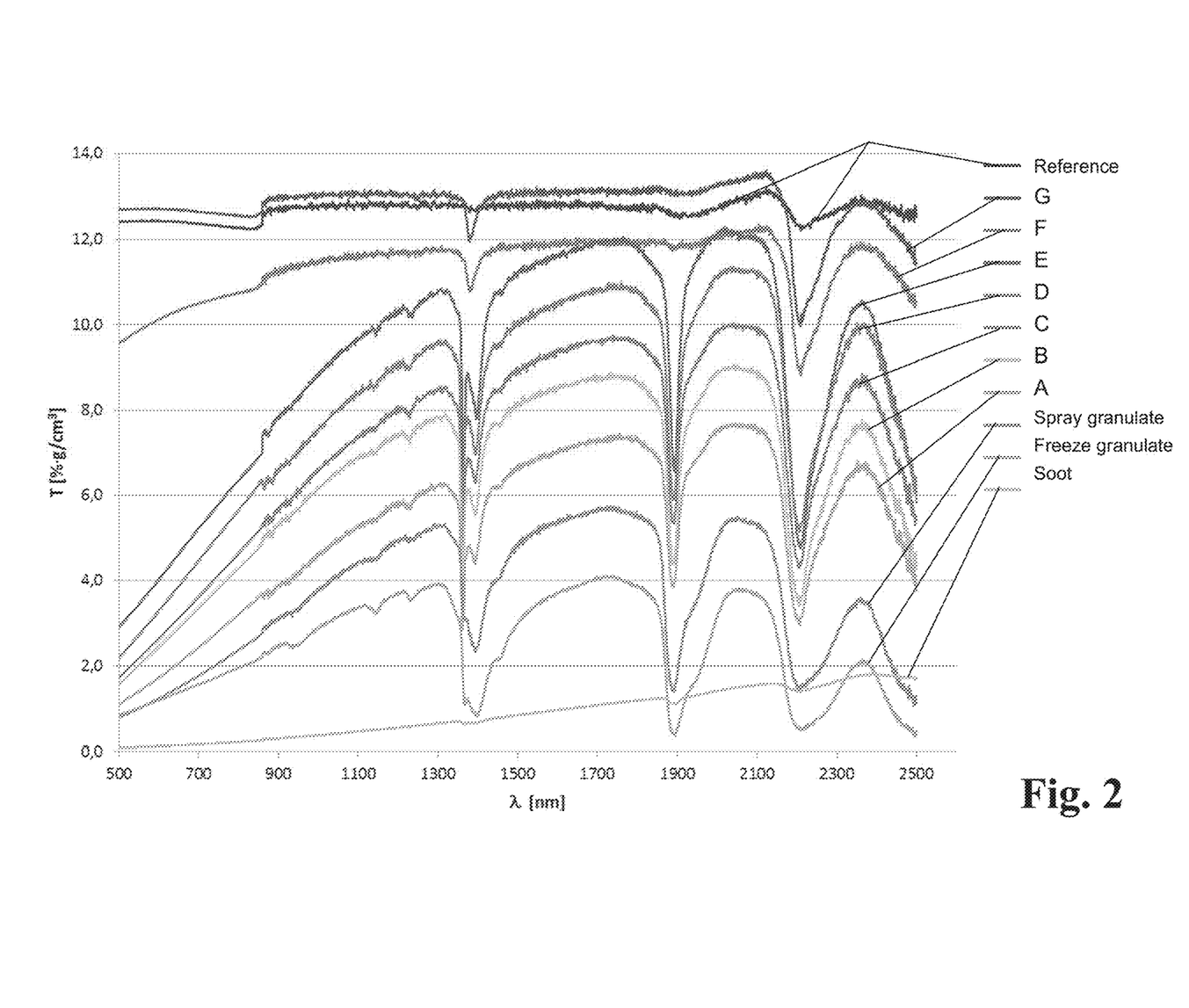
FIG. 2 shows infrared transmission spectra of the granulates.

The transmission curves of FIG. 2 show that the IR transmission at the wavelength of 1700 nm is increasing with the thermal densification of the $SiO_2$ granulate, reaching a maximum shortly before complete densification. By comparison, the fully densified $SiO_2$ granulate, i.e., quartz glass granules, may again show a slightly lower IR transmission, which can be attributed to increased reflection on the reflective vitrified surface. The IR transmission of the completely vitrified and transparent quartz glass granules without bubbles represents a suitable "reference value" for the IR transmission of the $SiO_2$ granulate particles. The quartz glass granules which serve as a reference material and the $SiO_2$ granulate particles consist of chemically identical $SiO_2$ material. In the simplest case, the reference quartz-glass granules are formed by complete vitrification of the granulate whose IR transmission has to be determined.

The IR transmission is measured, for example, by using an integrating sphere on the $SiO_2$ granulate in bulk form with a thickness of 4.2 mm in a measuring cuvette. Over the measurement length of 4.2 mm, a high-porosity granulate yields a smaller $SiO_2$ mass occupation than low-porosity granulate. To make the measurement values comparable despite these different granulate densities, they are normalized to the bulk density of the respective granulate. The normalization consists of multiplying the transmission measurement value determined by the integrating sphere (in %) by the specific bulk density of the $SiO_2$ granulate (in $g/cm^3$). The transmission value T determined thereby at the measurement wavelength of 1700 nm is here called "$T_{1700}$."

As has been described above (and is apparent from FIG. 2), the IR transmission (particularly the $T_{1700}$ value) of $SiO_2$ granulate particles in bulk form may be even higher than the reference values measured on the fully vitrified quartz glass granules. However, granulate particles with such a high IR transmission (more than 95% of the reference value) surprisingly do not show the advantageous fusion behavior of the granulate optimized to IR transmission. Possibly, the very high IR transparency is a sign that the granulate particles are almost completely dense and no longer manifest any open porosity. The closed residual pores of such granulate particles can no longer be subjected to degassing measures in the fusion process.

Therefore, according to the invention a $SiO_2$ granulate which is as dense as possible but still shows open pores and the porosity of which is preferably at least 10% is used for melting according to method step (d). Under the boundary condition regarding the maintenance of the open porosity, the $SiO_2$ granulate is densified mechanically and/or thermally to such an extent that it shows an IR transparency that is as high as possible. It has been found that the appropriate degree of densification is accompanied by an IR transmission that is in the range of 50-95% of the reference value at the wavelength of 1700 nm, preferably in the range of 60-90%.

The porosity of the $SiO_2$ granulate remaining after mechanical and/or thermal densification depends on the densification-relevant properties of the $SiO_2$ primary particles, on the respective granulation process and the resulting morphology, porosity and size distribution of the granulate particles, and on the type and intensity of the densification process itself. This shall be explained in more detail hereinafter.

A typical transmission curve of a still open-pore $SiO_2$ granulate shows a rise in transmission in the wavelength range between 500 and 1300 nm. This transmission curve, which strongly depends on the wavelength, can be ascribed to scattering on structures in the sub-micrometer range. It evidently depends on the porosity of the $SiO_2$ granulate and in the case of a highly densified granulate, the rise is small or is even missing altogether. A measure of this rise is the difference in the infrared transmission values $T_{500}$ and $T_{1700}$, respectively measured at wavelengths of 500 nm and 1700 nm. A small difference indicates a high densification of the granulate. Empirically, it has been found that in cases where the ratio $T_{500}/T_{1700}$ is more than 0.8, such a high densification of the granulate is apparently reached that closed pores are formed which impede fusibility.

Therefore, it has turned out to be advantageous when sintering atmosphere, sintering temperature and sintering duration are adjusted during sintering in step (c) that the densified $SiO_2$ granulate manifests a material-specific infrared transmission $T_{500}$ at a wavelength of 500 nm, and that the ratio $T_{500}/T_{1700}$ is 0.8 or less. The ratio $T_{500}/T_{1700}$ of approximately 0.8 marks the transition between still open-pore $SiO_2$ granulate pores and closed-pore $SiO_2$ granulate that is too densified.

A procedure is preferred in which melting in step (d) comprises heating a bulk material of $SiO_2$ granulate or a compact consisting of the $SiO_2$ granulate under negative pressure at the melting temperature.

An advantageous property of the $SiO_2$ granulate optimized to IR transparency is that it generates a comparatively small scattering for infrared ration and is therefore more easily fusible than $SiO_2$ granulate that is not optimized for IR transparency. A further advantage is that it has a minimum density that is given by the lower limit value of $T_{1700}$. This property also promotes easier fusibility of the granulate. Therefore, when this $SiO_2$ granulate is used, the energy- and time-consuming hot treatment step with additional degassing measure, namely application of negative pressure or vacuum (<2 mbar), can be similarly short in the method according to the invention as in the fusion of completely vitrified quartz glass granules, and at any rate significantly shorter than in the use of a conventional $SiO_2$ granulate. This is also true when the granulate is exposed to a mechanical pressure prior to the fusion process, for instance by way of cold-isostatic uniaxial pressing or during the fusion process, in addition to the use of negative pressure (vacuum), e.g., by hot isostatic pressing.

In this connection it has also turned out to be useful when the densified $SiO_2$ granulate has a bulk density in the range of 0.9 kg/l to 1.3 kg/l and preferably of at least 1.1 kg/l.

Due to the comparatively high bulk density, the $SiO_2$ granulate particles are easily fusible.

In the invention, it is the open porosity of the individual $SiO_2$ granulate particles that is of importance and not the porosity of the bulk granulate material. Open porosity of a material manifests itself basically in that it is permeable to gases and thus absorbtive for liquids, which can be demonstrated by a dye penetration test. A granulate particle which is not permeable to gases, like nitrogen, is defined as being dense and having no open porosity. As a measure of open porosity of the individual $SiO_2$ granulate particles, the invention uses the ratio $T_{500}/T_{1700}$ that is 0.8 or less in the case of open porosity.

The specific BET surface area determined by the BET method is in the range of 1 $m^2/g$ to 25 $m^2/g$, preferably in the range of 3 $m^2/g$ to 20 $m^2/g$. A BET surface area of more than 20 $m^2/g$ impedes fast fusion of the granulate.

Sintering is carried out in the simplest case in an atmosphere consisting of air or inert gas. However, it has turned out to be particularly useful when the sintering atmosphere contains chlorine and when the sintering temperature is at least 1000° C., preferably at least 1100° C.

The chlorine-containing atmosphere contains, for instance, HCl or $Cl_2$. This treatment particularly effects a reduction of alkali and iron impurities from the $SiO_2$ granulate and an elimination of hydroxyl groups. At temperatures below 100° C., the treatment periods are long and temperatures above 1000° C. pose the risk of dense sintering of the porous granulate with inclusion of chlorine or gaseous chlorine compounds.

A small hydroxyl group content is obtained in the densified $SiO_2$ granulate after the dehydration treatment. The chlorine content may be lowered by an after-treatment in an oxygen-containing atmosphere. Low concentrations of hydroxyl groups and chlorine facilitate the bubble-free fusion of the granulate particles.

The sintering treatment of the $SiO_2$ granulate is preferably carried out in a bulk state, i.e., in a loose, flowable state. For the prevention of agglomerate formations between the granulate particles it has turned out to be advantageous when sintering in step c) is carried out in a rotary furnace.

Furthermore, a method variant is preferred in which granulation in step (b) is performed by freeze granulation, and granulate particles with a platelet-shaped morphology are obtained.

In freeze granulation, a dispersion of the $SiO_2$ primary particles is deep-frozen and subsequently freeze-dried, with the frozen liquid evaporating by sublimation in high vacuum. A low pore $SiO_2$ granulate is thereby obtained.

In another procedure that is also suited, granulation in step (b) is performed by spray granulation, and granulate particles with a spherical morphology are obtained.

In the granulation of $SiO_2$ particles, an undesired fine fraction is obtained with a granulate that is not agglomerated or is insufficiently agglomerated; this fraction poses problems in the subsequent sintering or fusion of the granulate. In spray granulation, the given size of the granulate particles may be adjusted relatively exactly and the fine fraction is relatively small. Due to the manufacturing method spray granulate particles have a morphology that promotes the flowability of the granulate. This facilitates the sintering treatment of the $SiO_2$ granulate in its bulk state.

It has been found that the IR transmission of $SiO_2$ granulate depends on the particle size of the granulate particles. At mean particle sizes of more than 100 μm ($D_{50}$ value), the greater the IR transmission, the greater is the mean particle size.

Therefore, during granulation in step (b), preferably open-pore $SiO_2$ granulate is produced from granulate particles having a mean particle size of at least 150 μm, preferably at least 200 μm. Preferably, the open-pore $SiO_2$ granulate obtained by granulation in step (b) has a BET surface area in the range of 20 $m^2$/g to 100 $m^2$/g.

Particle size and particle size distribution of the granulate particles are characterized by the $D_{50}$ value of a particle size distribution curve (cumulative volume of the $SiO_2$ granulate particles relative to the particle size). The $D_{50}$ value characterizes a particle size which is not reached by 50% of the cumulative volume of the $SiO_2$ granulate particles. The particle size distribution is determined by scattered-light and laser-diffraction spectroscopy according to ISO 13320. The mean particle size is determined in the simplest case by sieve analysis according to DIN 66165-2. Here, "mean particle size" stands for the $D_{50}$ value of the granulate.

Approximately identical particle sizes are advantage to fusion of granulate particles that are as homogeneous as possible. In this respect, it has also turned out to be useful when the granulate particles have a narrow particle size distribution, in which the particle size assigned to the $D_{90}$ value is at most three times as large as the particle size assigned to the $D_{10}$ value.

Preferably, pyrogenically obtained $SiO_2$ particles are used during granulation in step (b). These $SiO_2$ primary particles are obtained by oxidation or by flame hydrolysis of a silicon-containing feedstock, particularly preferably a chlorine-free, silicon-containing feedstock. Such $SiO_2$ primary particles are distinguished by a particularly high purity and sintering activity, so that their granulation may be carried out by known granulation methods without the addition of binders.

A reliable feedstock for the production of synthetic quartz glass is silicon tetrachloride ($SiCl_4$). This substance may be converted by flame hydrolysis in the presence of hydrogen and oxygen and by pyrolysis, respectively, in the presence of oxygen into $SiO_2$. This entails, however, the drawback that chlorine or chlorine compounds that impede the use of unprotected metallic components because of their corrosiveness are formed during conversion. To avoid this drawback, the use of another silicon-organic compound is therefore suggested, from which $SiO_2$ can be formed by hydrolysis or oxidation. Polyalkylsiloxanes should here be mentioned by way of example.

Synthesis of $SiO_2$ Primary Particles $SiO_2$ primary particles are obtained as so-called "soot" in the production of synthetic quartz glass. Soot is deposited using flame hydrolysis burners that are reversingly reciprocated in a joint burner row along a rotating carrier tube. The flame hydrolysis burners are respectively fed with oxygen and hydrogen as burner gases and with an $SiO_2$ feedstock vapor as feedstock for the formation of the $SiO_2$ particles. The vapor contains a mixture of evaporated polyalkylsiloxanes, including hexamethylcyclotrisiloxane (D3), octamethylcyclotetrasiloxane (D4) and decamethylcyclopentasiloxane (D5). D4 is the main component of the polyalkylsiloxane feedstock with an amount of 98% by weight.

The $SiO_2$ soot particles which are produced are present in the form of agglomerates or aggregates of the $SiO_2$ primary particles with particle sizes in the nanometer range. The $SiO_2$ soot particles are deposited on the cylindrical outer surface of the carrier tube rotating about its longitudinal axis, so that a soot body is built up layer by layer.

Part of the $SiO_2$ soot particles passes via suction into a filter system and is obtained as so-called "soot dust" or "filter dust."

This pyrogenically obtained $SiO_2$ soot material of high purity is present in a particle size of less than 100 nm and typically has a specific (BET) surface area of about 30 $m^2$/g and a bulk density of about 0.1 kg/l. It is used for producing $SiO_2$ granulate.

Production of $SiO_2$ Spray Granulate

A $SiO_2$ slip is produced by dispersing the pyrogenically obtained $SiO_2$ soot material of high purity in deionized water. The dispersion is adjusted to a liter weight of 1380 g/l. The slip viscosity is 450 mPas. The slip is then sprayed at a hot air temperature of 400° C. and at a slip pressure of 10.5 bar using a commercially available spray dryer.

A spray granulate with a mean grain diameter of 214 μm is obtained. The fine fraction with a diameter below 100 μm is separated due to the manufacturing method during spray granulation by a cyclone. Each granulate particle is present as an agglomerate of individual spherical $SiO_2$ primary particles. The mean particle size of the $SiO_2$ primary particles is about 50 nm. The agglomerate of the $SiO_2$ primary particles is loose, so that it can be ground and crushed by applying a slight mechanical pressure. Open pore channels are formed between the $SiO_2$ primary particles. The specific (BET) surface area of the spray granulate is 30 m²/g and the bulk density is 0.8 kg/l.

Production of Freeze Granulate

In a frost-proof, closable PTFE bottle, a $SiO_2$ slip is prepared by dispersing the pyrogenically obtained $SiO_2$ soot material of high purity in deionized water. The solids content of the slip is 12% by weight. For homogenization, the $SiO_2$ slip is stirred for several hours. The PTFE bottle is subsequently deep-frozen overnight in a freezer at −18° C.

During defrosting, the agglomerated $SiO_2$ particles separate as sediment from the water, so that the sediment is present in the lower half of the container and a more or less clear liquid is present above the sediment. The liquid is poured off. The remaining residual water is removed with a centrifuge from the moist sediment of agglomerated $SiO_2$ particles. At a speed of 5000 rpm, a $SiO_2$ granulate is obtained after about five minutes; this granulate is dried thoroughly in the drying cabinet at a temperature of 200° C. The fine fraction with a diameter below 100 µm is sieved off. A freeze granulate with a mean grain diameter of 216 µm is obtained. The specific (BET) surface area is 30 m²/g and the bulk density is 0.54 kg/l.

Cleaning and Sintering of the Spray Granulate

Figure 1:
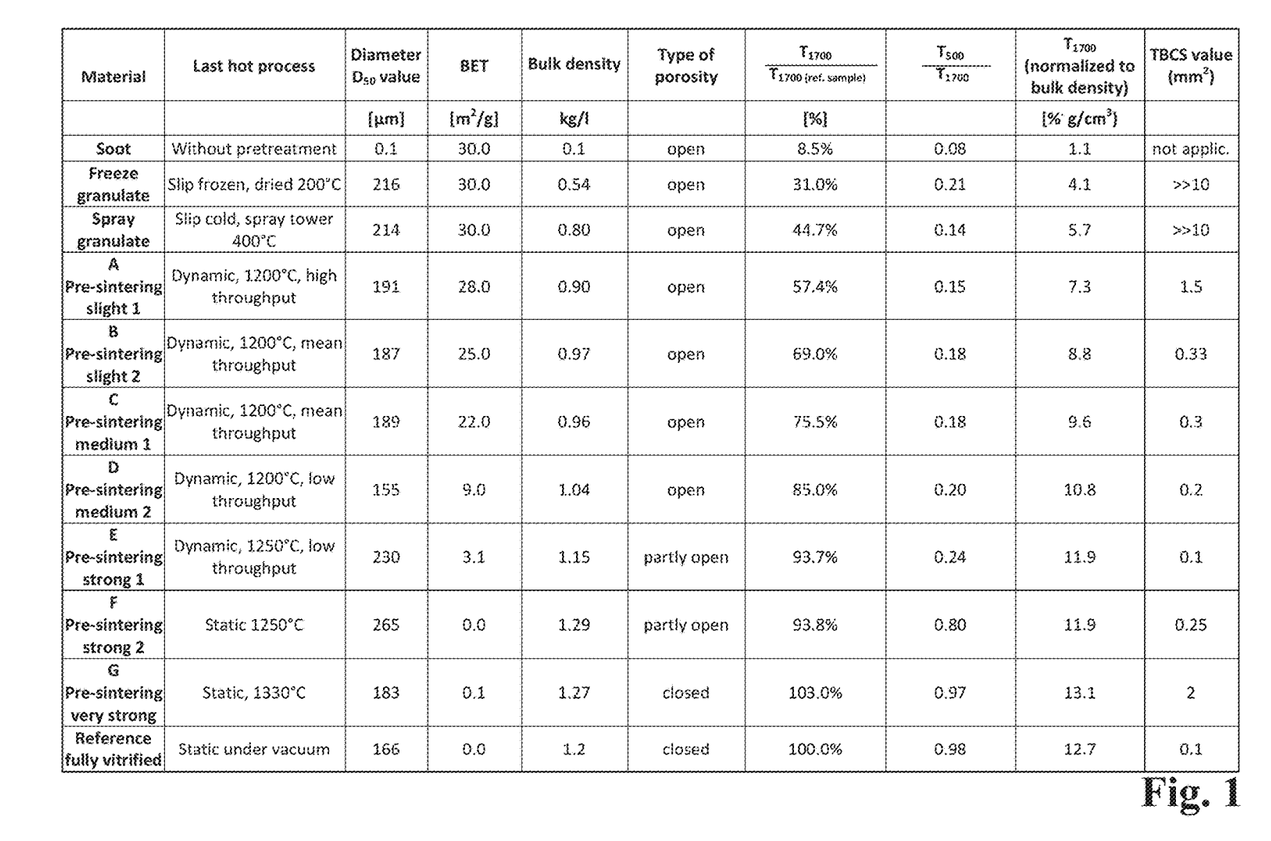
FIG. 1 is a table which summarizes parameters of the production process and properties of different granulates.

The $SiO_2$ spray granulate is subsequently cleaned in a continuous furnace in an $HCl/Cl_2$ gas mixture and thereby thermally pre-densified. In a test series, the maximum temperature and the throughput (and thus the mean residence time in the rotary furnace) were varied, as indicated in the second column of Table 1. "Mean throughput" means about 15 kg/h. The accompanying mean residence time is about 30 minutes. Low throughput and high throughput are about 5 kg/h lower or higher. In the samples treated in the rotary furnace, the "last hot treatment step" (second column of the table) is marked as "dynamic."

In some samples of the test series, the granulates were not cleaned and sintered in the rotary furnace, but in a graphite crucible with a corresponding $HCl/Cl_2$ mixture. The residence time was 4 hours each time. In the samples densified in this way, the "last hot treatment step" is called "static" in Table 1.

After this cleaning and sintering treatment, the granulate particles are thermally densified. The individual $SiO_2$ primary particles are grown together relatively firmly by so-called "neck formation." The pore channels existing before sintering have narrowed, but may still be permeable and at least partly open, depending on the intensity of the thermal action (sintering temperature and sintering duration). The corresponding degree of porosity is called "open" or "partly open" in column 5 of Table 1. In the transition region, in which parts of the previously open pore channels are closed and other parts are still open, the $SiO_2$ granulate no longer shows optimum properties in the vitrification to quartz glass. The pore channels are closed at least superficially and are noted as "closed" in column 5. The corresponding example of Sample G is a comparative example. The porosity of the granulate particles is low in these cases, and there is the risk that gases of the rotary-furnace atmosphere are entrapped, so that a bubble-rich quartz glass is produced during fusion. As a measure of this, the ratio $T_{500}/T_{1700}$ is used, which is greater than 0.8 in this case.

Each densified granulate is characterized by its particle size distribution. A narrow particle size distribution is desired on account of facilitated fusibility. A particle size distribution, in which the particle size assigned to the $D_{90}$ value is not more than three times as great as the particle size assigned to the $D_{10}$ value, is desired. As far as necessary, a possible fine fraction of the granulate or a fraction of coarse granulate particles that may, e.g., have formed during cleaning and sintering by agglomeration is removed for this purpose prior to melting. The particle size distribution of Sample E (Table 1) is, e.g., characterized by the following figures:

D10: 130 µm
D50: 230 µm
D90: 380 µm

Moreover, the specific BET surface area, the porosity, the bulk density and the purity have been determined for each granulate. The total content of the impurities of Li, Na, K, Mg, Ca, Fe, Cu, Cr, Mn, Ti, and Zr is each time less than 200 wt. ppb. The other measurement results are also shown in Table 1.

Dense Sintering of Spray Granulate for the Preparation of a Reference Sample

A batch of the $SiO_2$ spray granulate is introduced into an evacuable crucible for producing dense transparent quartz glass granules and is heated in vacuum (residual pressure <2 mbar) for a holding period of four hours to a temperature of 1450° C.

The completely vitrified $SiO_2$ particles are transparent and have no or only a few small bubbles. Their BET surface area is zero. The mean particle size is 166 µm and the bulk density is 1.20 kg/l. These quartz glass granules are used as a "reference sample" for IR transmission measurements.

Fusion of the Granulates into Quartz Glass

The granulates and the quartz glass granules were fused into quartz glass. Fusion was each time carried out under the same conditions by introducing a batch of 1 kg of the granulate into an evacuable melting crucible of graphite, heating up the melting crucible to an end temperature of 1700° C. in vacuum (residual pressure <2 mbar) and holding at that temperature for a holding period of 200 minutes. After expiration of half the holding period, the softened quartz glass mass was subjected to a mechanical uniaxial pressure of 15 bar. The cooled quartz glass bodies were visually checked for bubbles and evaluated.

In principle, each of the $SiO_2$ granulates could possibly be fused into a bubble-free transparent quartz-glass body if only the heating intensity (temperature and holding period) is chosen to be sufficiently high. The present fusion process, however, is conceived such that the heating intensity for fully vitrified granulate (quartz glass granules) is just sufficient to obtain a bubble-free transparent quartz glass body as the end product.

The question whether and to what extent this fusion process, which is very tight with respect to the applied heating energy, also yields high-quality quartz glass for less densified $SiO_2$ granulates (namely Samples A to G and the not additionally thermally densified spray granulate and freeze granulate, respectively) is indicated in the last column of Table 1. The so-called TBCS value as a measure of the bubble content of the respectively obtained quartz glass body is listed and is representative of the quality of the quartz glass. The TBCS value designates the sum of the cross-sectional areas (in mm²) of all bubbles within a sample volume of 100 cm³. This value is determined by visually detecting the bubbles and adding the bubble cross-sections, bubbles with diameters of less than 0.08 mm being not recorded.

FIG. 2 shows the infrared transmission spectra of the granulates and the $SiO_2$ soot, respectively, and of the completely vitrified quartz glass granules as a reference sample over the wavelength range of 500-2500 nm. The IR transmission was measured using an integrating sphere (company Perkin-Elmer, lambda 900) on a bulk material of $SiO_2$ granulate with a thickness of 4.2 mm in a measuring cuvette of quartz glass, normalized to an empty sample (cuvette without filling=empty intensity $I_0$). The distance of the measuring cuvette from the entrance of the integrating sphere is 4 mm. The opening of the integrating sphere has a diameter of 23 mm and its diameter is 60 mm. The measurement beam has a cross section of about 10×10 mm. The measured transmission (T(measured)=$I/I_0$) follows from the measured intensity I by measurement of the diffuse and directed transmission of the sample in the integrating sphere.

The $SiO_2$ granulates differ in their density, i.e., their mass occupation per volume unit. A measure of the different mass occupation is the bulk density. To make the transmission measurement values comparable despite different mass occupation over the measurement length, the transmission values are therefore normalized to the bulk density of the respective granulate. This means that they are multiplied by the specific bulk density of the granulate as indicated in column 5 of Table 1. The transmission values T plotted on the ordinate are therefore determined as T (measured)×bulk density, as: T=measuring intensity I/empty intensity $I_0$×bulk density. They have the unit [% $g/cm^3$] and are valid for a measurement length of 4.2 mm.

It can be seen that the wavelengths 500 nm and 170 nm, which are particularly used for characterizing the invention, are hardly influenced by absorption bands that are caused by water and OH groups. As a rule, the transmission is increasing with an increasing densification (in the order of the samples soot, freeze granulate, spray granulate, thermally densified Samples A to G). The maximum transmission of Sample G is even slightly higher than the maximum transmission of the reference sample consisting of quartz glass granules. The material-specific transmission $T_{1700}$ at the wavelength of 1700 nm can serve as a measure of the degree of densification of the respective granulate.

Furthermore, it can be seen that the still completely or at least substantially open-pore $SiO_2$ granulates of Samples A to E show a significant rise in transmission in the wavelength range between 500 nm and 1300 nm. In the particularly highly densified Samples F and G (and in the reference sample) this rise is small or does not exist at all. The transition between Sample E (partly closed porosity) and Sample F (also still partly closed porosity) is particularly significant. The porosity of both samples is characterized as "partly closed." Evidently, already small differences in porosity are distinctly noticeable in the rise of the transmission curve in the wavelength range of 500 nm to 1300 nm. This rise is thus also a measure of the porosity or optical scattering effect of the respective granulate. It is characterized by the difference of the material-specific infrared transmission values $T_{500}$ and $T_{1700}$, respectively, measured at the wavelengths 500 nm and 1700 nm. Column 8 of Table 1 shows that in Sample E this material-specific transmission ratio is still 0.24, whereas it has risen suddenly to 0.8 in Sample F, which is evaluated as a limit value of the "open porosity" of the densified granulate particles. The ratio is already 0.97 in Comparative Sample G.

As shown in the last column of Table 1, the quartz glass with the lowest bubble content (measured as TBCS value) is achieved by using the completely vitrified quartz glass granules. This result had to be expected per se. A comparatively good quartz glass quality with respect to bubble content is, however, also achieved by using the two granulates of Sample D and particularly of Sample E. The granulates of Samples D and E, however, show a low pre-densification, as shown both in the transmission value $T_{1700}$ of 85% and 93.7%, respectively, and in the low values for the ratio $T_{500}/T_{1700}$, namely 0.2 and 0.24, respectively. Hence, these granulates yield a quartz glass quality with similar TBCS values as the completely vitrified quartz glass granulates under the same fusion conditions. The preparation of the quartz glass from the only pre-densified granulates, however, requires comparatively smaller efforts in terms of energy and time. The reason is that the dense sintering of the spray granulate is more complicated than the preparation of the only partly densified granulates.

However, sample F, which is only slightly more densified in comparison with Sample E, shows a slightly higher bubble content and Sample G even a significantly higher bubble content (measured as TBCS value). Although in Sample F the mean densification, represented by $T_{1700}$, is also 93.8% (and thus similarly high as in Sample E), the ratio $T_{500}/T_{1700}$ is 0.8 and thus much higher than in Sample E. The quartz glass body produced from the granulate of Sample E turns out to be better in relation to the bubble content than that of Sample F and much better than that of Sample G.

The quartz glass obtained from Sample F is regarded as just acceptable, but nevertheless as suitable. The granulate of the very strongly densified Sample G yields, however, a quartz glass body with a rather disadvantageous transmission and emission behavior in the infrared wavelength range, represented by a high value of the material-specific transmission ratio $T_{500}/T_{1700}$ of 0.97, which surprisingly has many and/or large bubbles in addition, represented by the TBCS value of 2. The latter can be ascribed to the fact that, in the fusion process, gases which are entrapped in the granulate particles could expand due to heating, but could no longer escape.

Also, the slightly densified granulate of Sample A yields a bubble-containing quartz glass. The existing bubbles are, however, small, so that the quartz glass is still acceptable for applications where small demands are made on the absence of bubbles.

Figure 3:
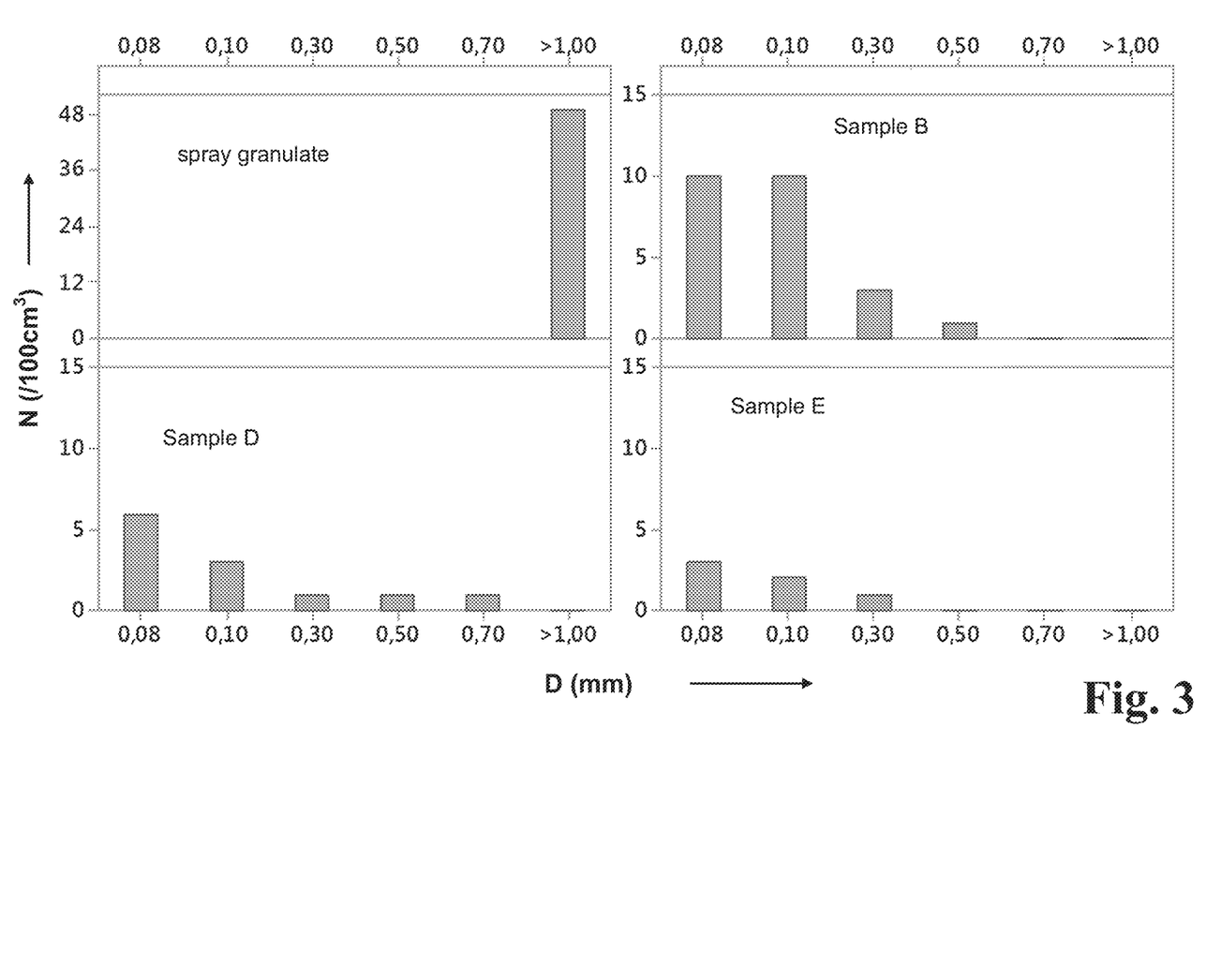
FIG. 3 shows graphs of bubble-frequency distributions in different samples.

In the histograms of FIG. 3, the bubble number N is respectively plotted on the ordinate (per 100 $cm^3$ sample volume) against the bubble diameter d (in mm) in the range of 0.08 mm to 1 mm (and more).

Hence, the spray granulate (histogram at the top at the left side) exclusively shows bubbles with diameters of 1 mm and more; the bubble number is about 50.

This bubble number is approximately halved in Sample B, which is only moderately densified thermally (see Table 1; histogram at the top at the right side), but particularly the bubble size is much reduced. Most bubbles only have bubble diameters in the range of the detection limit (0.08 mm).

This densification effect is also noticeable in the bubble number and diameter of the more strongly densified Samples D and E (lower histograms).

Definitions

For better understanding of the individual method steps and terms of the above description, the following definitions are provided.

1. Synthesis of $SiO_2$

"Synthetic quartz glass" consists of undoped or doped silicon dioxide which has preferably been produced by hydrolysis or oxidation of silicon-containing start material. Halogenated silicon compounds, such as $SiCl_4$, $SiHCl_3$ and alkoxides (tetramethoxysilane, TMOS, methyltrimethoxysilane, MTMS) or siloxanes (such as polyalkylsiloxanes, for instance octamethylcyclotetrasiloxane OMCTS) or mixtures of these starting materials are suitable as starting materials.

"SiO$_2$ primary particles" in the nanoscale range with a SiO$_2$ content of more than 99.99% and hardly any impurities are obtained by hydrolysis or oxidation. In their entirety, these form a finely divided "SiO$_2$ powder" which is also called "soot dust" or "soot."

SiO$_2$ powder has a high purity in the sense that the main component is SiO$_2$ and only small amounts of other elements in the ppm or ppb range are present. Impurities in the SiO$_2$ powder or in the quartz glass produced therefrom are determined by ICP-OES or ICP-MS methods, the concentrations being indicated in weight percentages.

The "specific (BET) surface area" is determined according to the method of Brunauer, Emmet and Teller (BET) on the basis of DIN 66132 and is based on gas absorption on the surface to be measured.

A particularly interesting group of chlorine-free feedstock is formed by the "polyalkylsiloxanes" (also briefly called "siloxanes"). Siloxanes can be subdivided into open-chain and closed-chain polyalkylsiloxanes. The polyalkylsiloxanes have the general sum formula $Si_pO_p(R)_{2P}$, where P is an integer $\geq 2$. The residue "R" is an alkyl group, in the simplest case a methyl group. Polyalkylsiloxanes are distinguished by a particularly high amount of silicon per weight percentage, which makes their use economic in the production of synthetic quartz glass. The polyalkylsiloxane feedstock, however, preferably contains three different polyalkylsiloxanes selected from hexamethylcyclotrisiloxane (D3), octamethylcyclotetrasiloxane (D4), decamethylcyclopentasiloxane (D5) and dodecamethylcyclohexasiloxane (D6). The abbreviations D3, D4, and D5 are based on a notation introduced by General Electric Inc., wherein D is also designated as "D4" and "D" represents the group [(CH$_3$)$_2$Si]-0-. In a preferred variant, D4 is the main component of the polyalkylsiloxane feedstock. Thus, the amount of D4 is at least 70% by wt., particularly at least 80% by wt., preferably at least 90% by wt. and particularly preferably at least 94% by weight.

2. Preparation of an SiO$_2$ Slip

The term "slip" is used for a suspension consisting of a liquid and SiO$_2$ powder. Water may be used as the liquid, which is cleaned by distillation or deionization to minimize the content of impurities. The SiO$_2$ powder is almost insoluble in water at room temperature, but may be introduced into water in high weight percentages.

The "particle size in the suspension" designates the particle size distribution of the solid particles contained in a suspension. It is measured by dynamic light scattering (DLS). The scattering behavior of laser light depends on the particle size and varies in time due to the Brownian motion of the particles. The diffusion coefficients of the particles follows from the analysis of intensity fluctuations. The particle size, in turn, may be calculated from the diffusion coefficients by the Stokes-Einstein equation.

3. Granulation

A distinction can be made between build-up granulation and press granulation and in terms of the technical process between wet and dry granulating methods. Known methods are roll granulation in a pan granulator, spray granulation, centrifugal atomization, fluidized-bed granulation, granulating methods using a granulating mill, compaction, roller presses, briquetting, flake production, or extrusion.

In the granulating process, discrete, rather large agglomerates, which are here called "SiO$_2$ granulate particles" or briefly "granulate particles" are formed by agglomerations of the SiO$_2$ primary particles. In their entirety, the granulate particles form an "SiO$_2$ granulate."

"Spray granulation" belongs to the group of wet granulating methods. During spray granulation, fine drops of the slip are formed, which are subsequently and simultaneously dried by a hot gas stream into a "spray granulate." The spray granulate particles may be obtained in different sizes in the range of a few micrometers up to a few millimeters in diameter.

The "particle size of the spray granulates" designates the macroscopic dimension of each solid granulate particle and is determined as the particle size distribution, normally by sieve methods or laser scattering methods. In sieve analysis, the powder is separated by sieve bottoms with different sieve sizes. This method is particularly simple and is therefore preferred. The weight percentage of the sieve material within a size range defined by two sieve sizes is plotted against the particle size, so that the particle size distribution is obtained. Typical size specifications are $D_{10}$, $D_{50}$ and $D_{90}$, designating the weight percentage of the sieve material in percent that is smaller than the corresponding value specification.

The term "bulk density" (also called "bulk weight") of a granulate or powder is indicated in mass per volume unit. The bulk density is defined as the mass of many material particles based on the total volume occupied by them. It is measured using a container of a known volume that is filled and weighed. The bulk density of substances present in powder or granulate form is determined according to the international standard ISO 697 (formerly DIN 53912). The term "tapped density" designates the density which is determined after mechanical densification of the powder or of the granulate, e.g., by vibration of the container. It is determined according to DIN/ISO 787 Part 11.

The "pore volume" of a porous material designates the free volume occupied by voids within the material. The pore volume is, e.g., measured by a porosimeter. A non-wetting liquid (such as mercury) is pressed under the action of an external pressure into the pores of a porous material against the counteracting surface tension forces. The force needed for this is inversely proportional to the pore size, and the pore size distribution of the sample can therefore also be determined apart from the total pore volume. Mercury porosimetry only detects pore sizes above 2 nm (mesopores and macropores).

"Micropores" are pores with pore sizes of less than 2 nm. Their contribution to the porosity and the specific surface area is determined by the V-t method by nitrogen absorption, with a sample being held at differently small pressures and 77 K. The method is similar to the BET method, wherein the pressure range is expanded to higher pressures, so that surfaces of the non-microporous part of the material are also recorded.

4. Cleaning of the Granulate

During "cleaning" the content of impurities in the granulate is reduced. The main impurities are residual water (OH groups), carbonaceous compounds, transition metals, alkali metals, and alkaline earth metals that derive from the starting material or are introduced by the processing. A small impurity content may be achieved by using pure starting materials and by corresponding equipment and processing under cleanroom conditions. To fulfill even higher demands made on purity, the granulate may be treated in a rotary furnace at a high temperature (<900° C.) in a chlorine-containing and oxygen-containing atmosphere. Residual water evaporates, organic materials react to form CO and $CO_2$, and many metals (such as iron and copper) may be converted into volatile chlorine-containing compounds.

After this treatment, the spray granulate shows an impurity content of less than 1 ppm for each of the metallic impurities.

5. Sintering/Densifying and Vitrifying

Here, "sintering" or "densifying" designates a method step in which an $SiO_2$ granulate is treated at an elevated temperature of more than 1100° C. either in a dynamic furnace (for instance in a rotary furnace) or in a static furnace. The specific (BET) surface area is reduced, whereas the bulk density and the mean particles size can increase due to agglomerations of granulate particles.

During "vitrification," the pre-densified sintered $SiO_2$ granulate is vitrified to form a quartz glass body. The granulate is filled into a melt mold which consists, for instance, of graphite or is lined with graphite foil. The melt mold is then heated in an electric furnace to a temperature of about 1700° C. or more. Heating is performed under "vacuum," which stands for an absolute gas pressure of less than 2 mbar. The softened quartz glass may be subjected to a static pressure (5 to 20 bar). After cooling to room temperature, a quartz glass body which is without bubbles, if possible, is obtained; this body is, e.g., suited for optical or semiconductor applications.

"Absence of bubbles" means that the total cross-sectional area of all bubbles within a sample based on a specific volume of 100 $cm^3$ is not more than 0.5 (TBCS value, total bubble cross section). The total cross section of all bubbles is indicated in square millimeters, with bubbles having a diameter of less than 0.08 mm being not counted.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing synthetic quartz glass, comprising the following method steps:
   (a) synthesizing amorphous $SiO_2$ primary particles,
   (b) granulating the amorphous $SiO_2$ primary particles to form an open-pore $SiO_2$ granulate,
   (c) sintering the open-pore $SiO_2$ granulate by heating in a sintering atmosphere at a sintering temperature and for a sintering period to form a densified $SiO_2$ granulate, and
   (d) melting the densified $SiO_2$ granulate at a melting temperature to form the synthetic quartz glass;

wherein for the production of transparent quartz glass, the sintering atmosphere, the sintering temperature, and the sintering duration are adjusted during sintering in step (c) such that the densified $SiO_2$ granulate still comprises open pores and manifests a material-specific infrared transmission $T_{1700}$ at a wavelength of 1700 nm, wherein the transmission is in a range of 50-95% of the infrared transmission $T_{1700}$ of reference quartz glass granules formed by complete vitrification of same $SiO_2$ granulate.

2. The method according to claim 1, wherein the infrared transmission $T_{1700}$ is in a range of 60-90% of the infrared transmission $T_{1700}$ of reference quartz glass granules formed by complete vitrification of same $SiO_2$ granulate.

3. The method according to claim 1, wherein the sintering atmosphere, the sintering temperature, and the sintering duration are adjusted during sintering in step (c) such that the densified $SiO_2$ granulate manifests a material-specific infrared transmission $T_{500}$ at a wavelength of 500 nm, and wherein a ratio $T_{500}/T_{1700}$ is 0.8 or less.

4. The method according to claim 1, wherein the melting in step (d) comprises heating a bulk material of $SiO_2$ granulate or a compact comprising the $SiO_2$ granulate under negative pressure at the melting temperature.

5. The method according to claim 1, wherein the densified $SiO_2$ granulate has a bulk density in a range of 0.9 kg/l to 1.3 kg/l.

6. The method according to claim 1, wherein the densified $SiO_2$ granulate has a specific BET surface area in a range of 1 $m^2/g$ to 25 $m^2/g$.

7. The method according to claim 1, wherein the sintering atmosphere contains chlorine and the sintering temperature is at least 1000° C.

8. The method according to claim 1, wherein the sintering in step (c) is performed in a rotary furnace.

9. The method according to claim 1, wherein the granulating in step (b) is performed by spray granulation, and wherein granulate particles with a spherical morphology are obtained.

10. The method according to claim 1, wherein the granulating in step (b) is performed by freeze granulation, and wherein granulate particles with a platelet-shaped morphology are obtained.

11. The method according to claim 1, wherein during granulating in step (b), open-pore $SiO_2$ granulate is produced from granulate particles having a mean particle size of at least 150 µm, and wherein the open-pore $SiO_2$ granulate has a BET surface area in a range of 20 $m^2/g$ to 100 $m^2/g$.

12. The method according to claim 1, wherein the granulate particles of the densified granulate have a narrow particle size distribution, wherein the particle size assigned to a $D_{90}$ value is at the most three times as large as the particle size assigned to a $D_{10}$ value.

13. The method according to claim 1, wherein during step (b), pyrogenically obtained $SiO_2$ primary particles are used, and wherein the $SiO_2$ primary particles are obtained by oxidation or flame hydrolysis of a chlorine-free silicon-containing feedstock.

14. An open-pore granulate consisting of synthetically produced amorphous $SiO_2$ primary particles, wherein at a wavelength of 1700 nm the granulate manifests a material-specific infrared transmission $T_{1700}$ in a range of 50-95% of the infrared transmission $T_{1700}$ of reference quartz glass granules formed by complete vitrification of same $SiO_2$ granulate.

15. The granulate according to claim 14, wherein the infrared transmission $T_{1700}$ is in a range of 60-90% of the infrared transmission $T_{1700}$ of reference quartz glass granules formed by complete vitrification of same $SiO_2$ granulate, and wherein at a wavelength of 500 nm the $SiO_2$ granulate manifests a material-specific infrared transmission $T_{500}$, and wherein a ratio $T_{500}/T_{1700}$ is 0.8 or less.

* * * * *